United States Patent
Je et al.

(10) Patent No.: US 12,034,314 B2
(45) Date of Patent: Jul. 9, 2024

(54) WIRELESS POWER AND DATA TRANSMISSION AND RECEPTION APPARATUS

(71) Applicant: Korea Advanced Institute of Science and Technology, Daejeon (KR)

(72) Inventors: Minkyu Je, Daejeon (KR); Yechan Park, Daejeon (KR); Chul Kim, Daejeon (KR); Seok-Tae Koh, Daejeon (KR); Jeongeun Lee, Daejeon (KR); Hongkyun Kim, Daejeon (KR); Jaesuk Choi, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 235 days.

(21) Appl. No.: 17/673,164

(22) Filed: Feb. 16, 2022

(65) Prior Publication Data

US 2023/0261525 A1 Aug. 17, 2023

(30) Foreign Application Priority Data

Feb. 11, 2022 (KR) .................. 10-2022-0018209

(51) Int. Cl.
*H02J 50/27* (2016.01)
*H02J 50/23* (2016.01)
(Continued)

(52) U.S. Cl.
CPC .............. *H02J 50/27* (2016.02); *H02J 50/23* (2016.02); *H04B 5/72* (2024.01); *H04B 5/79* (2024.01)

(58) Field of Classification Search
None
See application file for complete search history.

(56) References Cited

U.S. PATENT DOCUMENTS

| 7,167,090 B1* | 1/2007 | Mandal | H01Q 23/00 340/538.14 |
| 2014/0368056 A1* | 12/2014 | Hosotani | H01F 38/14 307/104 |

(Continued)

FOREIGN PATENT DOCUMENTS

KR 10-2020-0077082 A 6/2020

OTHER PUBLICATIONS

Yechan Park et al., "A Wireless Power and Data Transfer IC for Neural Prostheses Using a Single Inductive Link With Frequency-Splitting Characteristic", IEEE Transactions on Biomedical Circuits and Systems, Dec. 16, 2021, pp. 1-14.

(Continued)

*Primary Examiner* — Jared Fureman
*Assistant Examiner* — Joel Barnett
(74) *Attorney, Agent, or Firm* — Paratus Law Group, PLLC

(57) ABSTRACT

A power and data receiver according to the present embodiment includes: a reception coil configured to receive a power data signal from a transmission coil; a power unit forming driving power from the power data signal; and a data demodulation unit configured to demodulate a data signal from the power data signal, wherein the reception coil operates adjacent to the transmission coil to the extent that a first resonant frequency and a second resonant frequency are formed between the reception coil and the transmission coil, and the reception coil operates at a frequency greater than or equal to the first resonant frequency and smaller than or equal to the second resonant frequency in relation to the transmission coil.

22 Claims, 12 Drawing Sheets

(51) Int. Cl.
*H04B 5/72* (2024.01)
*H04B 5/79* (2024.01)

(56) References Cited

U.S. PATENT DOCUMENTS

| | | | |
|---|---|---|---|
| 2015/0108850 A1* | 4/2015 | Cho | H02J 50/12 |
| | | | 307/104 |
| 2015/0162785 A1* | 6/2015 | Lee | H02J 50/40 |
| | | | 307/104 |
| 2018/0062448 A1* | 3/2018 | Hubler | H02J 50/12 |

OTHER PUBLICATIONS

Yechan Park et al., "A Frequency-Splitting-Based Wireless Power and Data Transfer IC for Neural Prostheses with Simultaneous 115mW Power and 2.5Mb/s Forward Data Delivery", 2021 IEEE International Solid-State Circuits Conference (ISSCC 2021), Session 33.7, Feb. 18, 2021, pp. 472-474.
Korean Office Action for related KR Application No. 10-2022-0018209 mailed Jan. 17, 2023 from Korean Intellectual Property Office.
Kisong Lee et al., "Comparison of Achievable Efficiency for Different Resonator Structures in a Magnetic Resonance-based Wireless Power Transfer System", Journal of the Korea Institute of Information and Communication Engineering, May 2017, pp. 1035-1041, vol. 21, No. 5.

* cited by examiner

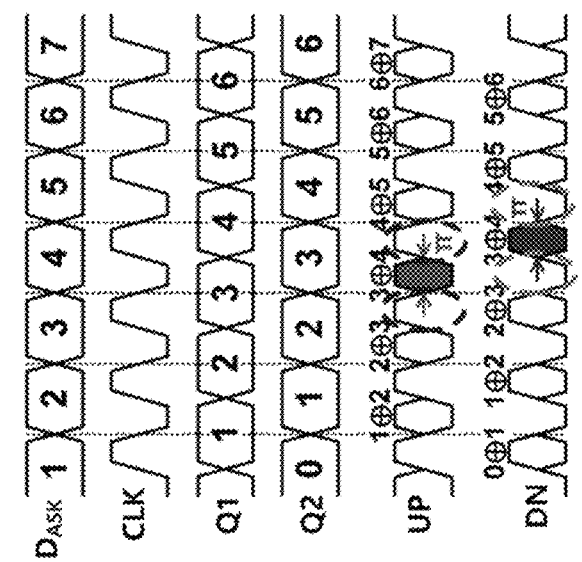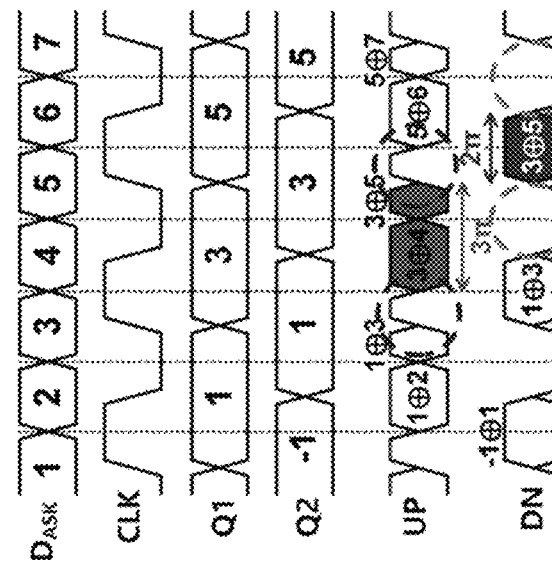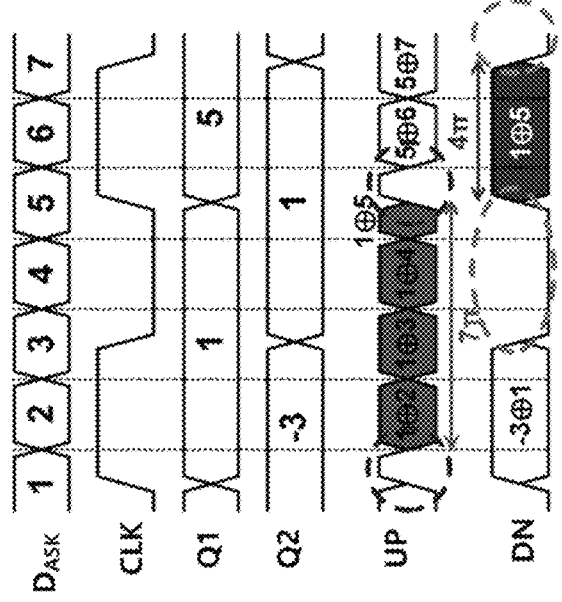

Fig. 12

| | RELATED ART 1 | RELATED ART 2 | RELATED ART 3 | RELATED ART 4 | EMBODIMENT |
|---|---|---|---|---|---|
| Direction | Downlink | Downlink | Downlink | Downlink | Downlink |
| Modulation | DPSK | PDM | ASK | CWM | FSK |
| Number of Coils | 4 (2 links) | 4 (2 links) | 2 (Single link) | 2 (Single link) | 2 (Single link) |
| Distance [mm] | 17 | 10 | 6 | 10 | 5 |
| Carrier Frequency [MHz] | 2 / 22 | 13.56 / 50 | 10 | 10 | 6.78 |
| Data Rate [Mbps] | 2 | 13.56 | 1 | 1.66 | 2.5 |
| Bit Error Rate | $2.5 \times 10^{-4}$ | $4.3 \times 10^{-7}$ | $<10^{-5}$ | N/A | $4 \times 10^{-7}$ |
| PDL [mW] | 150 | 42 | 24 | 29.7 | 115 |
| PTE [%] | N/A | N/A | >75[a] | 30 (Sim.) | 89.6 |
| DC-to-DC Efficiency [%] | 40 | N/A | 42 | N/A | 56.7 |
| FoM$_1$ [%] | 9.1 | 27.1 | 10 | 16.6 | 33.3 |
| FoM$_2$ [mΩ$^{-1}$] | N/A | N/A | >0.54[a,b] | 0.01[b] | 20.94 |

WIRELESS POWER AND DATA TRANSMISSION AND RECEPTION APPARATUS

CROSS-REFERENCE TO RELATED APPLICATION

This application claims priority to Korean Patent Application No. 10-2022-0018209 (filed on Feb. 11, 2022), which is hereby incorporated by reference in its entirety.

BACKGROUND

The present disclosure relates to a wireless power and data transmission and reception apparatus.

Devices for overcoming disabilities, such as a cochlear implant device for people who are hard of hearing, a retinal implant device for blind people, and the like greatly improve the lives of disabled people. These devices include an external device outside the living body and a device which is implanted in the living body and operates by receiving power and/or data from the external device.

Recently, optogenetic stimulation has been developed. Optogenetic stimulation refers to activating neurons and the like by providing light, and can quickly control nerve spikes through optogenetic stimulation with millisecond precision. In this case, since selectivity is relatively high and a current spreading phenomenon is small and thus a large number of channels can be used, resolution can be improved.

An implant device providing multiple stimuli through multiple channels is implanted in the body, and should have a small volume, high power efficiency, and a high data transmission rate.

In the past, a method of performing data and power transmission by dividing time was used, but there was a trade-off relationship between power transmitted to a load and a data transmission rate or between power transmission efficiency and a data transmission rate.

In order to solve this problem, a method of using four coils of data transmission and reception coils and power transmission and reception coils has been proposed, but there is a disadvantage in that the volume increases for implantation in the body.

One of the problems to be solved by the present disclosure is provided to solve the above-described difficulties of the related art. That is, providing a device capable of improving power transmission efficiency and an amount of power transmitted to a load while having a small volume and maintaining a data transmission rate is one of the problems to be solved by the present disclosure.

SUMMARY

A wireless power and data receiver according to the present embodiment includes: a reception coil configured to receive a power data signal from a transmission coil; a power unit configured to form driving power from the power data signal; and a data demodulation unit configured to demodulate a data signal from the power data signal, wherein the reception coil operates adjacent to the transmission coil to the extent that a first resonant frequency and a second resonant frequency are formed between the reception coil and the transmission coil, and the reception coil operates at a frequency greater than or equal to the first resonant frequency and smaller than or equal to the second resonant frequency in relation to the transmission coil.

According to one aspect of the present embodiment, a process of demodulating the data signal from the power data signal and a process of forming the driving power from the power data signal may be simultaneously performed.

According to one aspect of the present embodiment, the power data signal may be a signal in which the data signal is frequency-modulated to a carrier signal which transmits power.

According to one aspect of the present embodiment, the power unit may include any one of a half-wave rectifier and a full-wave rectifier.

According to one aspect of the present embodiment, the power unit may include a rectifier including a first branch including a first P-channel metal-oxide-semiconductor (PMOS) transistor and a diode-connected first N-channel metal-oxide-semiconductor (NMOS) transistor, and a second branch including a diode-connected second PMOS transistor and a second NMOS transistor, wherein the first NMOS transistor and the second NMOS transistor may be cross-coupled to each other.

According to one aspect of the present embodiment, the data demodulation unit may include a frequency-amplitude converter configured to convert the power data signal so that the power data signal has an amplitude corresponding to a frequency, a demodulator configured to demodulate a signal having a converted amplitude, and a clock data recovery unit configured to recover a clock and data from the demodulated signal.

According to one aspect of the present embodiment, the frequency-amplitude converter may include an oscillator that is frequency-locked according to an injection signal, and an injection switch providing the injection signal to the oscillator.

According to one aspect of the present embodiment, one electrode of the injection switch may be connected to the oscillator, the other electrode of the injection switch may be connected to an injection signal source, and a control electrode of the injection switch may be connected to the reception coil.

According to one aspect of the present embodiment, the injection signal source may be a current mirror, and the injection signal may be a current signal.

According to one aspect of the present embodiment, the demodulator may include an envelope signal forming unit configured to form an envelope signal corresponding to an envelope of an oscillator output signal, a low-pass filter configured to output a low-frequency component of the envelope signal, and a comparator configured to compare the envelope signal and the low-frequency component to output the data signal.

According to one aspect of the present embodiment, the clock data recovery unit may operate without a reference signal in a single loop.

According to one aspect of the present embodiment, the clock data recovery unit may include a frequency and phase difference detection unit, a charge pump configured to operate by an output signal of the frequency and phase difference detection unit, a loop filter controlled by the charge pump to form a control signal, and a voltage-controlled oscillator of which an output signal is controlled by the control signal.

According to one aspect of the present embodiment, the frequency and phase difference detection unit may include a first flip-flop to which an output of the demodulator is input, a second flip-flop connected to the first flip-flop in cascade, a first logic configured to perform a logical operation on the output of the demodulator and an output of the first flip-flop, and a second logic configured to perform a logical operation on the output of the first flip-flop and an output of the second flip-flop, and the second flip-flop may operate with a clock signal inverted from a clock signal provided to the first flip-flop.

According to one aspect of the present embodiment, the power unit may include one or more of a DC-DC converter and a battery.

A wireless power and data transmission and reception apparatus according to the present embodiment includes: a transmission side which transmits a power data signal formed by frequency-modulating a data signal to a carrier signal which transmits power using a transmission coil; and a reception side, which demodulates a power signal and the data signal from the power data signal and includes a reception coil, wherein the reception coil operates adjacent to the transmission coil to the extent that a first resonant frequency and a second resonant frequency are formed between the reception coil and the transmission coil, and the reception coil operates at a frequency greater than or equal to the first resonant frequency and smaller than or equal to the second resonant frequency.

According to one aspect of the present embodiment, the reception side may simultaneously perform a process of harvesting power and a process of demodulating the data signal from the power data signal.

According to one aspect of the present embodiment, the reception side may include a power unit configured to form a direct current voltage from the power data signal, and a data demodulation unit configured to demodulate the data signal from the power data signal.

According to one aspect of the present embodiment, the data demodulation unit may include a frequency-amplitude converter configured to convert the power data signal so that the power data signal has an amplitude corresponding to a frequency, a demodulator configured to demodulate a signal having a converted amplitude, and a clock data recovery unit configured to recover a clock and data from the demodulated signal.

The frequency-amplitude converter may include an oscillator that is frequency-locked according to an injection signal, and an injection switch providing the injection signal to the oscillator.

According to one aspect of the present embodiment, one electrode of the injection switch may be connected to the oscillator, the other electrode of the injection switch may be connected to a current mirror which is an injection signal source to receive a current signal which is an injection signal, and a control electrode of the injection switch may be connected to the reception coil.

According to one aspect of the present embodiment, the demodulator may include an envelope signal forming unit configured to form an envelope signal of an oscillator output signal, a low-pass filter configured to output a low-frequency component of the envelope signal, and a comparator configured to compare the envelope signal and the low-frequency component to output the data signal.

According to one aspect of the present embodiment, the clock data recovery unit may operate without a reference signal in a single loop.

According to one aspect of the present embodiment, the clock data recovery unit may include a frequency and phase difference detection unit, a charge pump configured to operate by an output signal of the frequency and phase difference detection unit, a loop filter controlled by the charge pump to form a control signal, and a voltage-controlled oscillator of which an output signal is controlled by the control signal.

According to one aspect of the present embodiment, the reception side may be implanted in the body to operate.

The present embodiment has a good form factor characteristic, and has a high power transmission amount and efficiency and a high data transmission rate compared to the related art.

BRIEF DESCRIPTION OF THE DRAWINGS

FIGS. 8A to 8C are timing diagrams for describing a frequency adjustment operation of a frequency and phase difference detection unit;

FIG. 12 is a view in which characteristics of the present embodiment and the related art are compared.

DETAILED DESCRIPTION

Figure 1:
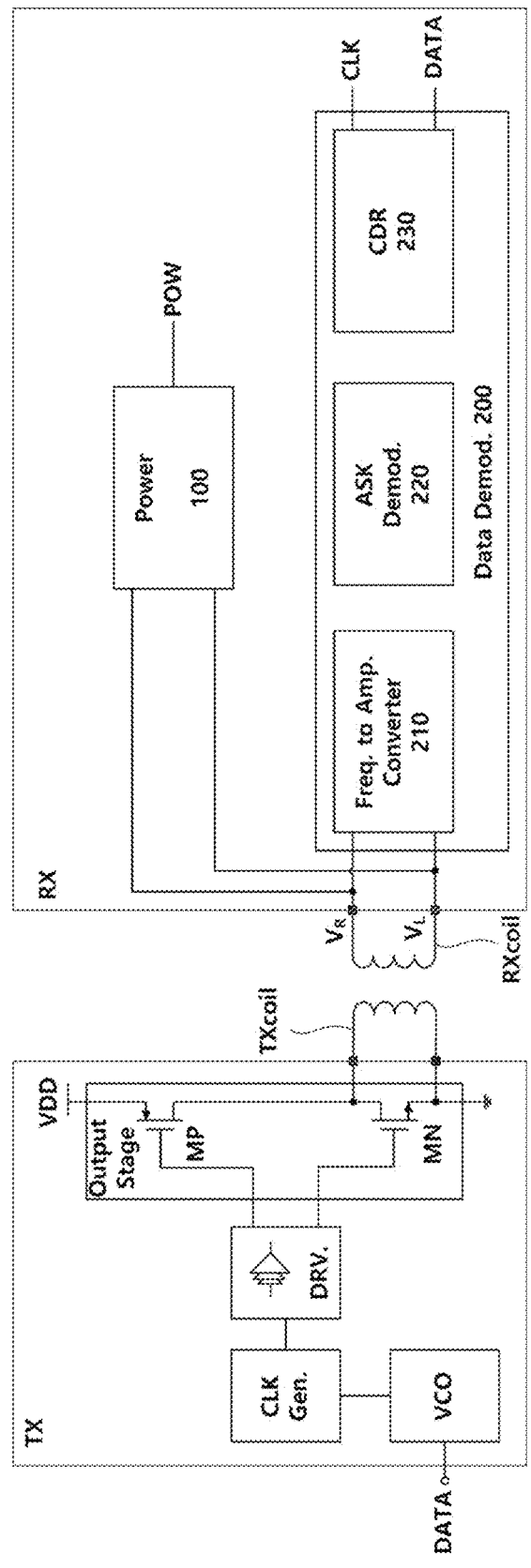
FIG. 1 is a block diagram illustrating an overview of a wireless power and data transmission and reception apparatus according to the present embodiment.

Hereinafter, the present embodiment will be described with reference to the accompanying drawings. FIG. 1 is a block diagram illustrating an overview of a wireless power and data transmission and reception apparatus 10 according to the present embodiment. Referring to FIG. 1, the wireless power and data transmission and reception apparatus 10 according to the present embodiment includes: a transmission side TX which transmits a power data signal formed by frequency-modulating a data signal to a carrier signal which transmits power using a transmission coil TXcoil; and a reception side RX, which demodulates a power signal and the data signal from the power data signal, including a reception coil RXcoil, in which the reception coil RXcoil operates adjacent to the transmission coil TXcoil to the extent that a first resonant frequency and a second resonant frequency are formed, and the reception coil RXcoil operates at a frequency greater than or equal to the first resonant frequency and smaller than or equal to the second resonant frequency.

Referring to FIG. 1, the transmission side TX modulates a carrier wave which transmits power to input data DATA and transmits the carrier wave to the reception side RX through the transmission coil TXcoil. As one embodiment, an electrically controllable oscillator VCO oscillates at a predetermined frequency. The electrically controllable oscillator VCO receives the input data DATA, and modulates and outputs a frequency to correspond to the received input data DATA.

A clock generator CLK Gen and a pulse width modulation (PWM) driver DRV receive the frequency-modulated signal to correspond to the input data DATA, and generate a pulse width modulation signal corresponding to the frequency-modulated signal. The PWM driver DRV forms gate driving signals of a P-channel metal-oxide-semiconductor (PMOS) transistor MP and an N-channel metal-oxide-semiconductor (NMOS) transistor MN and outputs the gate driving signals to the PMOS transistor MP and the NMOS transistor MN. The transmission coil TXcoil is connected to an output stage of the transmission side TX, and outputs the frequency-modulated signal to correspond to the input data DATA.

Figure 2A:
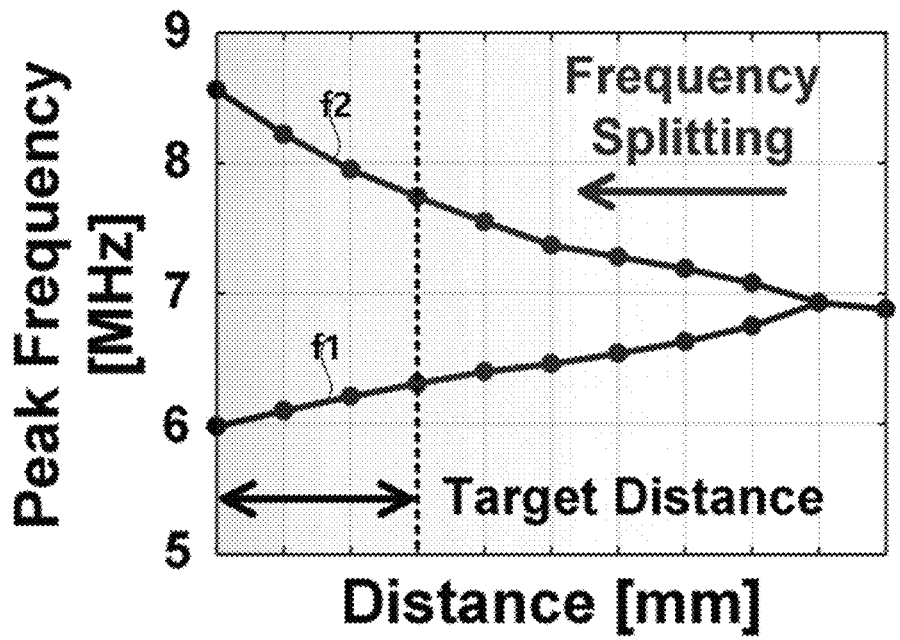
FIG. 2A is a view illustrating a resonance frequency change according to a separation distance between two adjacent coils.
Figure 2B:
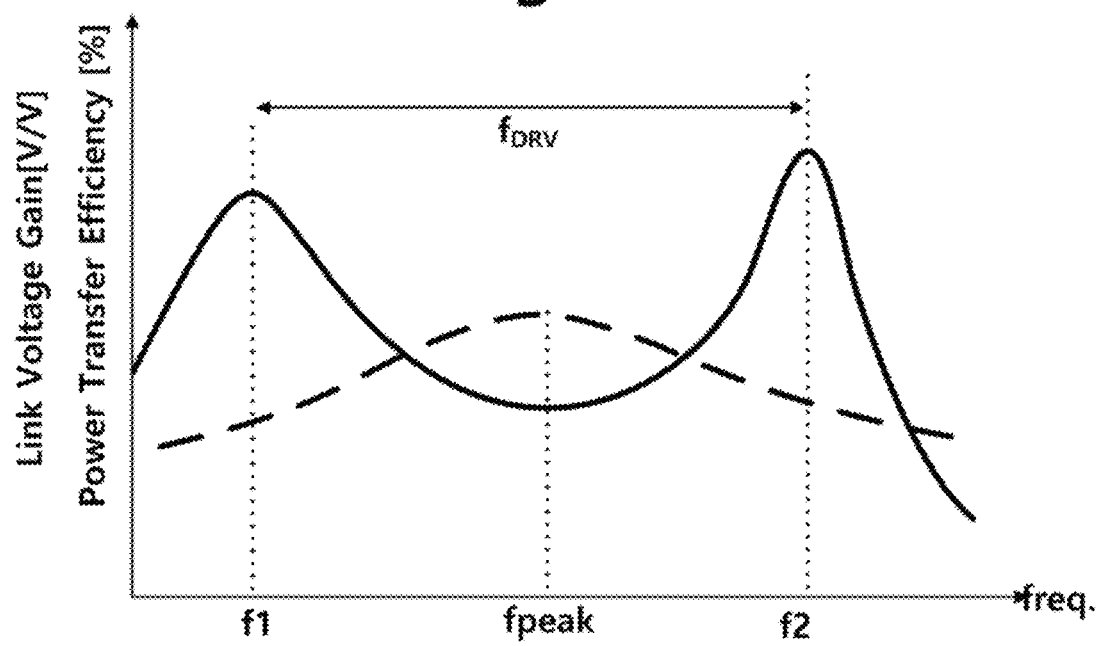
FIG. 2B is a view illustrating a link voltage gain and power transmission efficiency between a transmission coil and a reception coil according to the present embodiment.

The reception coil RXcoil is coupled to the transmission coil TXcoil and receives the frequency-modulated signal. FIG. 2A is a view illustrating a resonance frequency change according to a separation distance between two adjacent coils, and FIG. 2B is a view illustrating a link voltage gain (solid line) and power transmission efficiency (dashed line) between the transmission coil TXcoil and the reception coil RXcoil of the present embodiment. Referring to FIGS. 2A and 2B, the transmission coil TXcoil and the reception coil RXcoil have a single resonant frequency when spaced apart from each other by a predetermined distance or more. However, as the distance between the transmission coil TXcoil and the reception coil RXcoil decreases, it can be seen that the resonant frequency splits into a first resonant frequency f1 and a second resonant frequency f2, and it can be seen that a difference between the first resonant frequency and the second resonant frequency increases as the distance between the transmission coil TXcoil and the reception coil RXcoil decreases.

In the present embodiment, the transmission coil TXcoil and the reception coil RXcoil operate in a state adjacent to each other so that the resonant frequency splits into the first resonant frequency f1 and the second resonant frequency f2 which are different resonant frequencies. Further, an operating frequency range $f_{DRV}$ of the transmission coil TXcoil and the reception coil RXcoil is between a frequency greater than or equal to the first resonant frequency f1 and smaller than or equal to the second resonant frequency f2. For example, the operating frequency range $f_{DRV}$ of the transmission coil TXcoil and the reception coil RXcoil may be in a range of ~15% to +15% from a peak frequency fpeak.

In the frequency range $f_{DRV}$ in which the transmission coil TXcoil and the reception coil RXcoil operate, the power transmission efficiency is greater than other frequency ranges and is generally constant within the frequency range.

Figure 3:
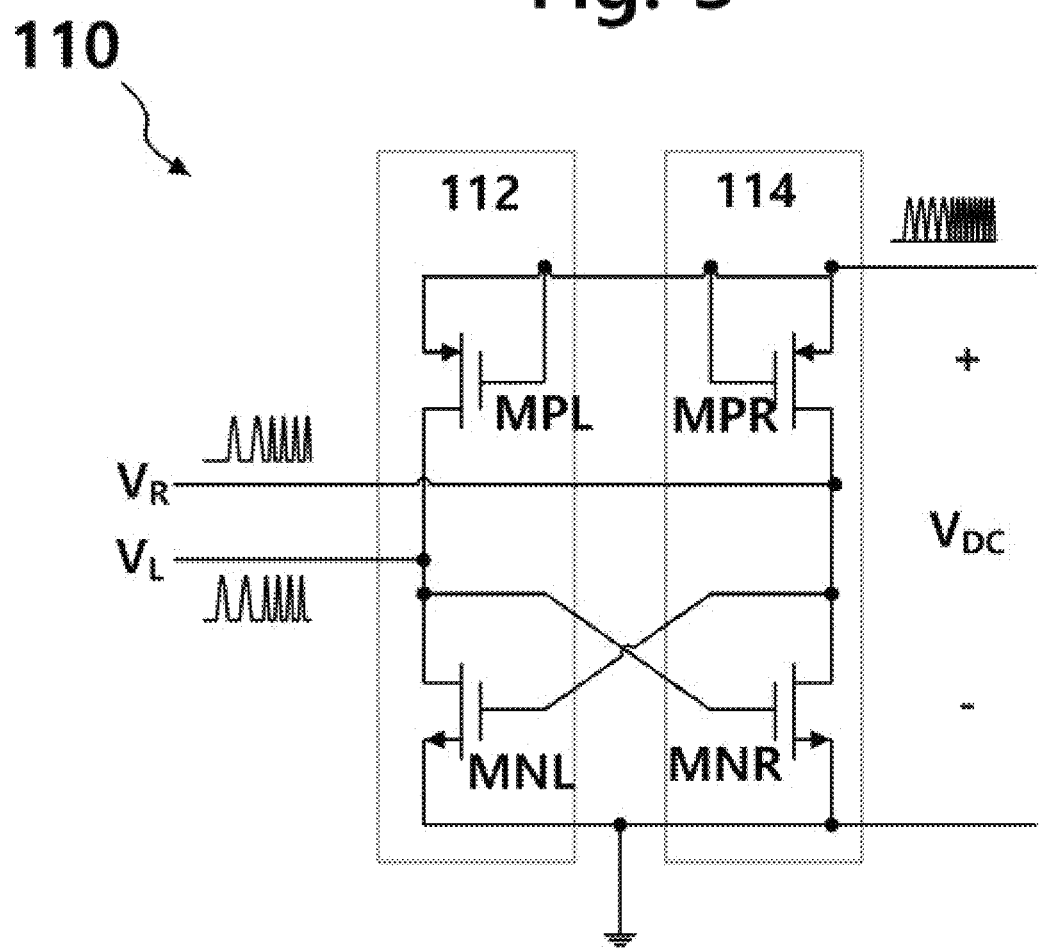
FIG. 3 is a schematic circuit diagram illustrating an overview of a rectifier circuit according to the present embodiment.

FIG. 3 is a schematic circuit diagram illustrating an overview of a rectifier circuit 110 according to the present embodiment. Referring to FIGS. 1 and 3, a power unit 100 includes the rectifier circuit 110 which receives and rectifies a signal received from the reception coil RXcoil. The rectifier circuit 110 includes a first branch 112 including an NMOS transistor MNL connected in series with a diode-connected PMOS transistor MPL, and a second branch 114 including an NMOS transistor MNR connected in series with a diode-connected PMOS transistor MPR.

The first branch 112 and the second branch 114 may be connected in parallel to each other, and the NMOS transistor MNL included in the first branch 112 and the NMOS transistor MNR included in the second branch 114 are cross-coupled to each other. The first branch 112 is connected to one end of the reception coil RXcoil to receive a signal $V_L$ output from the reception coil RXcoil. The second branch 114 is connected to the other end of the reception coil RXcoil to receive a signal $V_R$ output from the reception coil RXcoil.

Referring to FIG. 1, the input signals $V_L$ and $V_R$ provided to the first branch 112 and the second branch 114 are signals having a phase difference of 180 degrees from each other. As the input $V_R$ is provided from the other end of the reception coil RXcoil, the NMOS transistor MNL of the first branch cross-coupled to the diode-connected PMOS transistor MPR of the second branch 114 conducts. However, as the input $V_L$ of a ground potential is provided from one end of the reception coil RXcoil, the NMOS transistor MNR of the second branch cross-coupled to the diode-connected PMOS transistor MPL of the first branch 112 is cut off. Accordingly, the rectifier circuit 110 outputs a signal formed by the input signal $V_R$ during a half cycle of the signal output by the reception coil RXcoil.

During the next half cycle, as the input $V_L$ is provided from the one end of the reception coil RXcoil, the NMOS transistor MNR of the second branch cross-coupled to the diode-connected PMOS transistor MPL of the first branch 112 conducts. However, as the input $V_R$ of a ground potential is provided from the other end of the reception coil RXcoil, the NMOS transistor MNL of the first branch cross-coupled to the diode-connected PMOS transistor MPR of the first branch 112 is cut off. Accordingly, the rectifier circuit 110 outputs a signal formed by the input signal $V_L$ during the half cycle of the signal output by the reception coil RXcoil.

In an embodiment which is not exemplified, the rectifier circuit may be implemented as one of a half-wave rectifier and a full-wave rectifier which are not shown.

A signal $V_{DC}$ rectified and output by the rectifier circuit 110 may be a pulsating pulse, and as one embodiment, the rectifier circuit 110 may further include a smoothing capacitor which smooths the rectified signal and/or a resistor. According to the present embodiment, as will be described below, since frequency modulation is used, continuous power supply along with data transmission are possible, and thus a power transmission amount may increase, and a data transmission rate may be improved.

The power unit 100 may further include a step-up converter (not shown) which boosts a DC voltage $V_{DC}$ output from the rectifier circuit 110 or a step-down converter (not shown) which lowers the DC voltage $V_{DC}$ output from the rectifier circuit 110.

According to an embodiment which is not shown, the reception side RX may further include a battery charged with a direct current formed in the rectifier circuit 110. For example, the battery may be a rechargeable battery, and the reception side RX may operate by receiving driving power from the battery.

Figure 4:
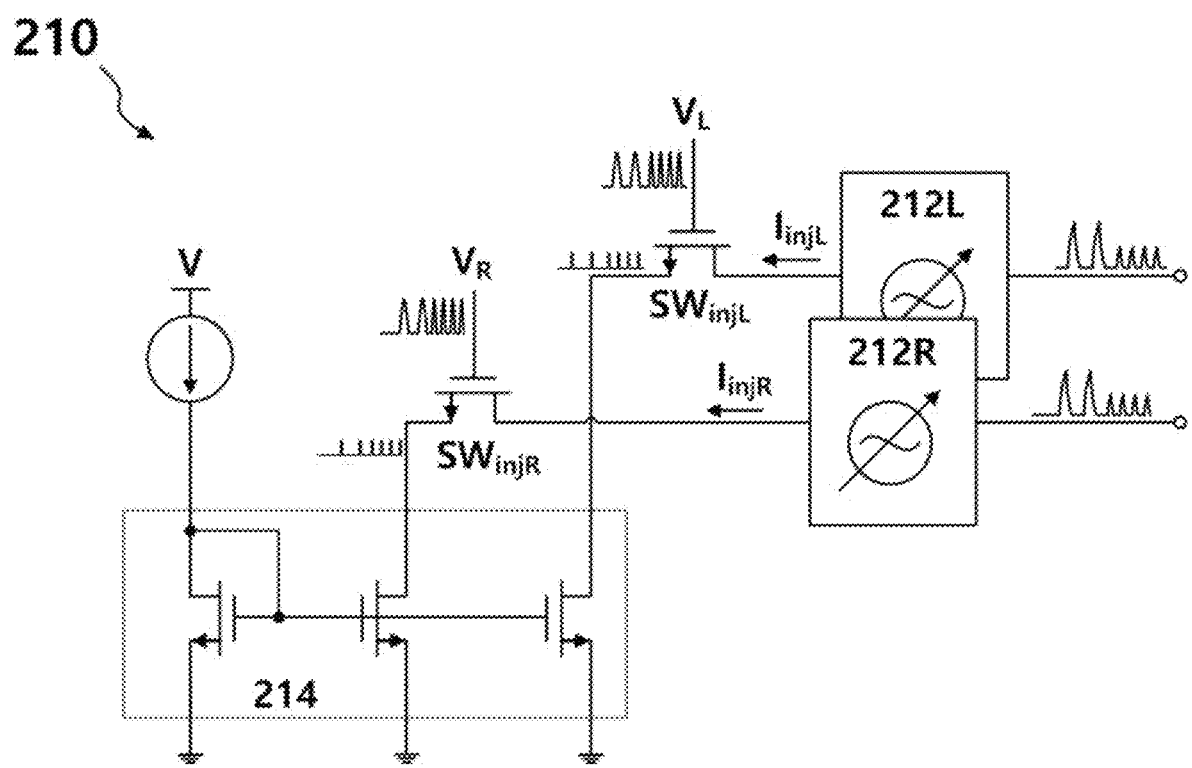
FIG. 4 is a circuit diagram illustrating an overview of a frequency-amplitude converter.
Figure 5A:
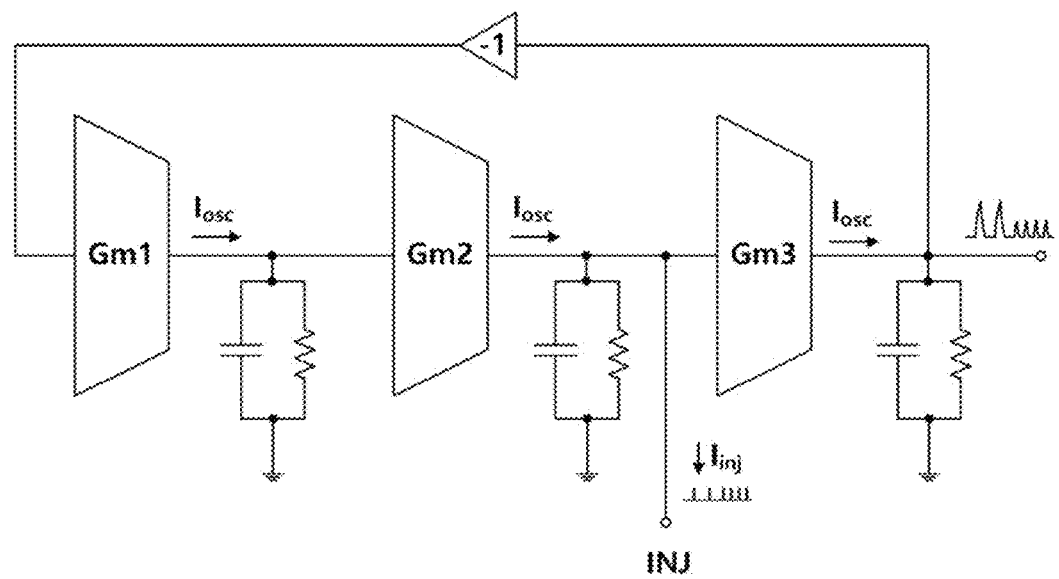
FIG. 5A is a circuit diagram illustrating an overview of an oscillator.
Figure 5B:
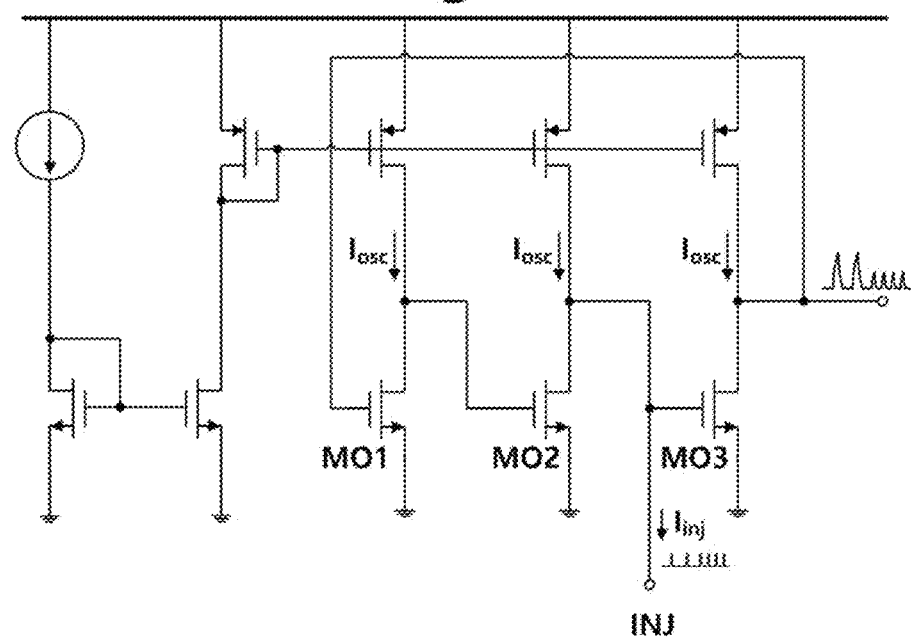
FIG. 5B is a transistor level circuit diagram of the oscillator.

FIG. 4 is a circuit diagram illustrating an overview of a frequency-amplitude converter 210. FIG. 5A is a circuit diagram illustrating an overview of an oscillator 212, and FIG. 5B is a transistor-level circuit diagram of the oscillator 212. Referring to FIGS. 1, 4, and 5, the frequency-amplitude converter 210 includes an injection lock ring oscillator (ILRO, 212) that is frequency-locked according to an injection signal, and injection switches $SW_{injR}$ and $SW_{injL}$ and an injection signal source 214 which conduct to provide the injection signal to the oscillator 212.

The voltage $V_L$ is input from one end of the reception coil RXcoil to a first injection switch $SW_{injL}$. The first injection switch $SW_{injL}$ conducts as the voltage $V_L$ is provided to a gate electrode, and a current mirror, which is the injection signal source 214, forms an injection signal $I_{injL}$, which is a current signal, and provides the injection signal $I_{injL}$ to the oscillator 212.

Similarly, the voltage $V_R$ is provided from the other end of the reception coil RXcoil to a second injection switch $SW_{injR}$. The second injection switch $SW_{injR}$ conducts as the voltage $V_R$ is provided to the gate electrode, and the current mirror, which is the injection signal source 214, forms an injection signal $I_{injR}$, which is a current signal, and provides the injection signal $I_{injR}$ to the oscillator 212.

In the present embodiment, the current signal is formed and injected into the oscillator 212. When the voltage signal is directly injected into the oscillator 212, since the voltage changes according to a load of the reception coil RXcoil, it is difficult to uniformly adjust the injected signal. However, like the present embodiment, since the injection signal $I_{inj}$ is formed as the current signal and injected into the oscillator 212 to form a constant injection signal $I_{inj}$ even when the voltage output from the reception coil RXcoil changes according to the influence of the load, there is an advantage in that the injection signal $I_{inj}$ may be provided to the oscillator 212.

A plurality of stages of the oscillator 212 are connected in cascade, and are connected through negative feedback. Each stage may include a trans-conductance amplifier and an accumulation unit. A trans-conductance amplifier GM1 in FIG. 5A corresponds to an NMOS transistor MO1 in FIG. 5B, a trans-conductance amplifier GM2 corresponds to an NMOS transistor MO2, and a trans-conductance amplifier GM3 corresponds to an NMOS transistor MO3.

In FIG. 5A, the accumulation unit including a capacitor and a resistor connected to the output of the trans-conductance amplifier may be a capacitor and a resistor formed at an output node of an NMOS transistor in FIG. 5B, and for example, may be a parasitic capacitor and a parasitic resistor formed at the output node of the NMOS transistor.

In each stage, the trans-conductance amplifier exemplified as the NMOS transistor receives a voltage and outputs a current corresponding to the received voltage. The accumulation unit accumulates the current forms a voltage corresponding to the provided current $L_{osc}$, and then outputs the voltage to a subsequent stage. As the injection signal $I_{inj}$ is injected in the second stage, a level of the voltage output from the second stage may be controlled. As one embodiment, when the injection signal $I_{inj}$ of a high frequency is provided, an amount of current provided to the accumulation unit decreases. Accordingly, a magnitude of the voltage signal output from the frequency-amplitude converter 210 decreases. On the other hand, when the injection signal $I_{inj}$ of a low frequency is provided, an amount of current provided to the accumulation unit to form a voltage increases. Accordingly, the magnitude of the voltage signal output from the frequency-amplitude converter 210 increases.

That is, since the injection-locked oscillator 212 is controlled by the injection signal according to the frequencies of the power data signal from the reception coil RXcoil, the frequency-modulated signal provided by the reception coil RXcoil may be converted into an amplitude-modulated signal.

Figure 6:
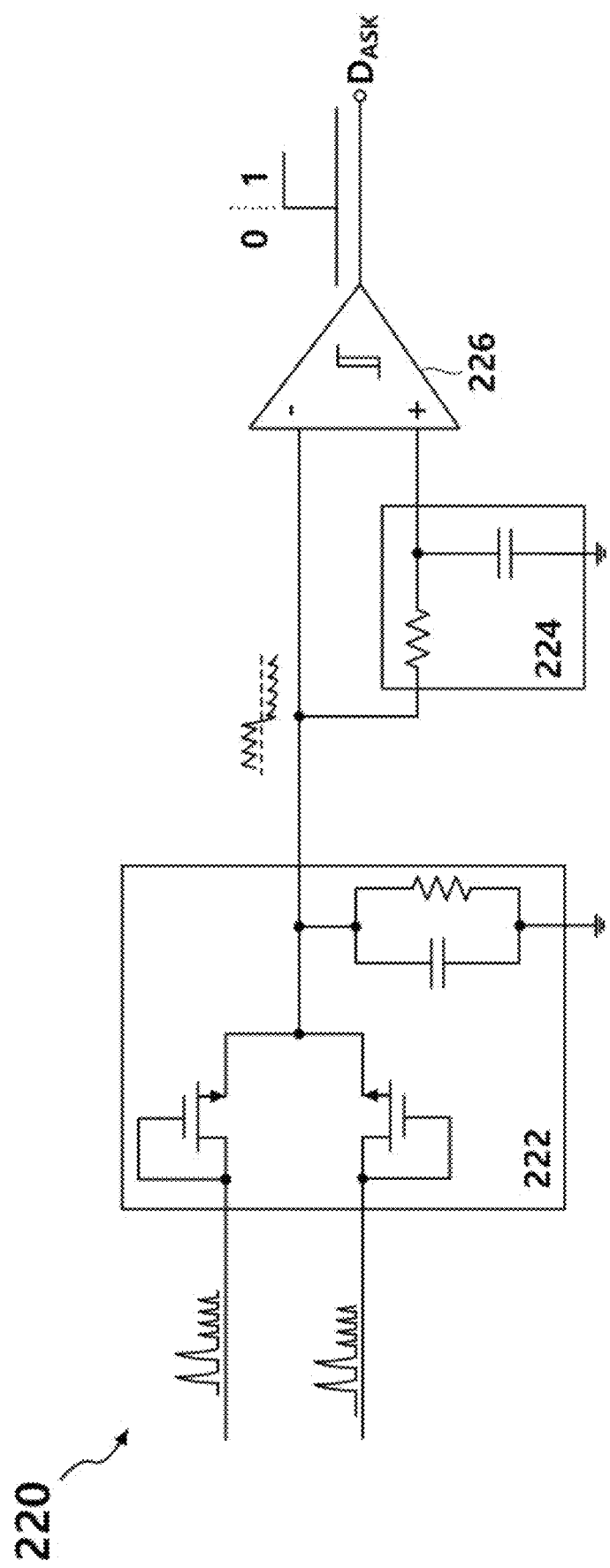
FIG. 6 is a circuit diagram illustrating an overview of an amplitude demodulation unit.

FIG. 6 is a circuit diagram illustrating an overview of an amplitude demodulation unit 220. Referring to FIGS. 1 and 6, the amplitude demodulation unit 220 includes an envelope signal forming unit 222 forming an envelope signal corresponding to an envelope of an output signal of the oscillator 212, a low-pass filter 224 which outputs a low-frequency component of the envelope signal, and a comparator 226 which outputs the data signal by comparing the envelope signal and the low-frequency component.

The signal transmitted through the transmission coil TXcoil by the transmission side TX modulating the data signal to different frequencies is converted into an amplitude-modulated signal by the frequency-amplitude converter 210. The amplitude-modulated signal is demodulated by the amplitude demodulation unit 220.

The envelope signal forming unit 222 includes diode-connected transistors which receive output signals of oscillators 212R and 212L, respectively, and a summing unit which totals and sums outputs thereof. In one embodiment, the diode-connected transistors pass a voltage greater than or equal to a conduction voltage of the diode in the output signals of the oscillators 212R and 212L, and the summing unit sums the signals output by the diode-connected transistors to form and output the envelopes of the output signals of the oscillators 212R and 212L.

The envelope signal is provided to one input of the comparator and the low-pass filter 224. In one embodiment, the low-pass filter 224 outputs a signal of a low band smaller than or equal to a cutoff frequency from the envelope signal and provides the signal to the other input of the comparator 226. For example, the low-pass filter 224 may output a DC voltage corresponding to an average of envelope signal levels. The comparator 226 receives the envelope signal and the output signal of the low-pass filter 224, and outputs a signal corresponding to a level difference between the two signals.

Figure 7:
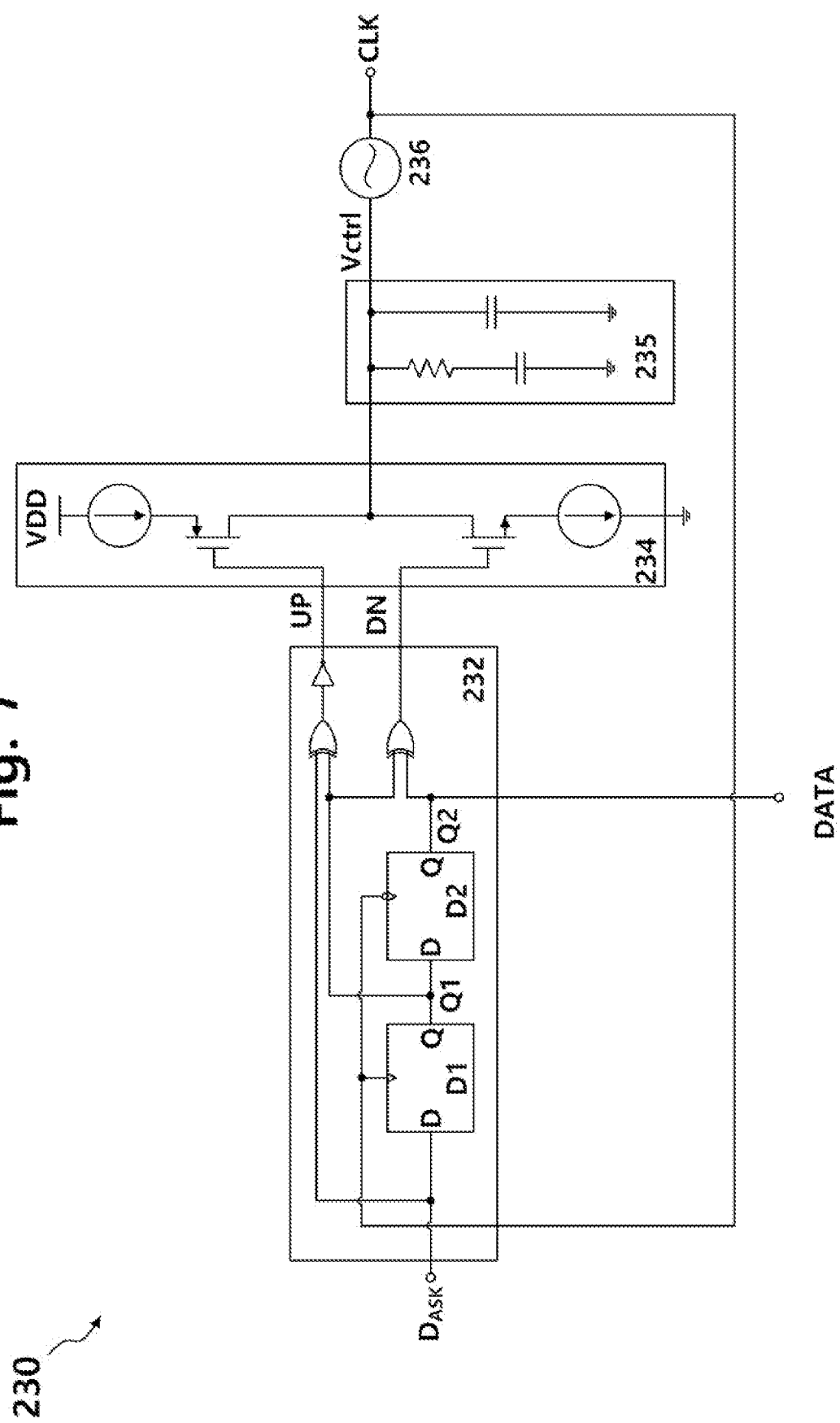
FIG. 7 is a view illustrating an overview of a clock data recovery unit according to the present embodiment.

FIG. 7 is a view illustrating an overview of a clock data recovery unit 230 according to the present embodiment. Referring to FIG. 7, the clock data recovery unit (CDR) 230 recovers a clock signal and a data signal from the amplitude-demodulated data and outputs the recovered signals. The clock data recovery unit 230 according to the present embodiment includes a frequency and phase difference detection unit 232, a charge pump 234, a loop filter 235 forming a control signal Vctrl by removing unnecessary bands from a pump-up signal UP and a pump-down signal DN output from the charge pump, and an oscillator 238 which outputs a phase and frequency controlled by the control signal Vctrl. The clock data recovery unit 230 according to the embodiment may perform clock and data recovery without providing a signal having a reference frequency as shown in FIG. 7.

FIGS. 8A to 8C are schematic timing diagrams for describing a frequency adjustment operation of the frequency and phase difference detection unit 232. Referring to FIGS. 7 and 8A, a case in which a frequency of a clock signal CLK corresponds to a quarter of a data transmission rate of a demodulated data signal $D_{ASK}$ is shown in FIG. 8A. The pump-up signal UP may be acquired by performing a logical operation on the demodulated data signal $D_{ASK}$ and an output Q1 of a first flip-flop D1, and the pump-down signal DN may be acquired by performing a logical operation on the output Q1 of the first flip-flop D1 and an output Q2 of a second flip-flop D2.

Looking at the pump-up signal UP, since a portion between portions indicated by two dashed lines is formed by performing an XNOR operation on the demodulated data signal $D_{ASK}$ and the output Q1 of the first flip-flop D1 having arbitrary logic levels, the probability of a logic high or logic low is 0.5. However, since the portion indicated by the dashed line is formed by performing an XNOR logic operation on the demodulated data signal $D_{ASK}$ and the output Q1 of the first flip-flop D1, it can be seen that the portion indicated by the dashed line necessarily has a logic high value.

Looking at the pump-down signal DN, a portion between portions indicated by two dashed lines is also formed by performing an XOR operation on the output Q1 of the first flip-flop D1 and the output Q2 of the second flip-flop D2 having arbitrary logic levels. Accordingly, the probability of a logic high or logic low is 0.5. However, since the portion indicated by the dashed line is formed by performing an XOR operation with the same logic level, it can be seen that the portion indicated by the dashed line necessarily has a logic low value.

Accordingly, it can be seen that a duration between regions included in the pump-up signal UP and fixed to a specific logic level and a duration between regions included in the pump-down signal DN and fixed to a specific logic level correspond to a frequency difference between the data transmission rate of the demodulated data signal $D_{ASK}$ and the clock signal CLK. From the above, the pump-up signal UP and the pump-down signal DN may be provided to the PMOS transistor and the NMOS transistor of the charge pump 234 to control conduction and cut-off and perform frequency detection.

In the embodiment shown by FIG. 8A, the duration between the regions included in the pump up signal UP and fixed to the specific logic level is longer. Accordingly, the PMOS transistor of the charge pump 234 is turned on to supply a current to the loop filter 235. The loop filter 235 accumulates the current and forms a control signal Vctrl from which an unnecessary high band is removed to provide the control signal Vctrl to the oscillator 236. The oscillator 236 forms and outputs the clock signal CLK corresponding to the provided control signal Vctrl.

FIG. 8B is a timing diagram when the frequency of the clock signal CLK is a half of the demodulated data signal $D_{ASK}$. Referring to FIG. 8B, it can be seen that the duration between the regions included in the pump-up signal UP and fixed to the specific logic level is reduced. Further, it can be seen that the duration of the region included between the dashed lines in the pump-down signal DN and fixed to the specific logic level is also slightly reduced.

Accordingly, as described above, since the charge pump 234 is controlled by providing the pump-up signal UP and the pump-down signal DN to the PMOS transistor and the NMOS transistor of the charge pump 234, as shown in FIG. 8C, the frequency of the clock signal CLK may be synchronized with the data transmission rate of the data-demodulated data signal $D_{ASK}$.

Figure 9A:
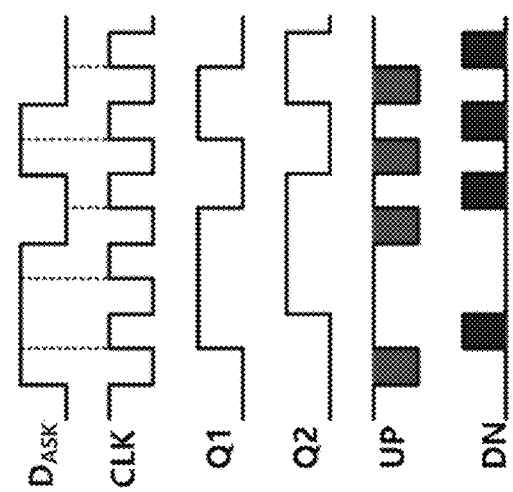
FIGS. 9A to 9C are views illustrating a process of synchronizing phases of a clock signal and a demodulated data signal.
Figure 9B:
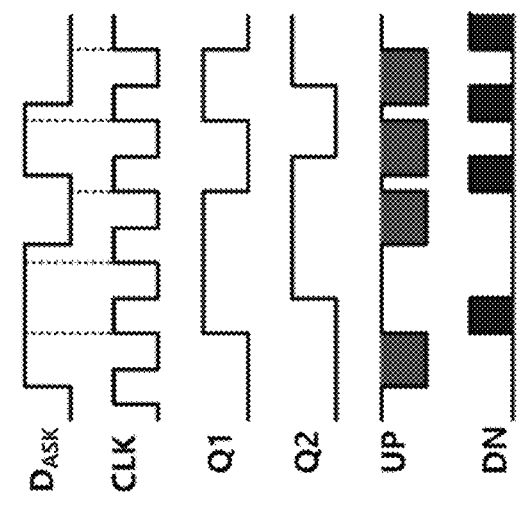
Figure 9C:
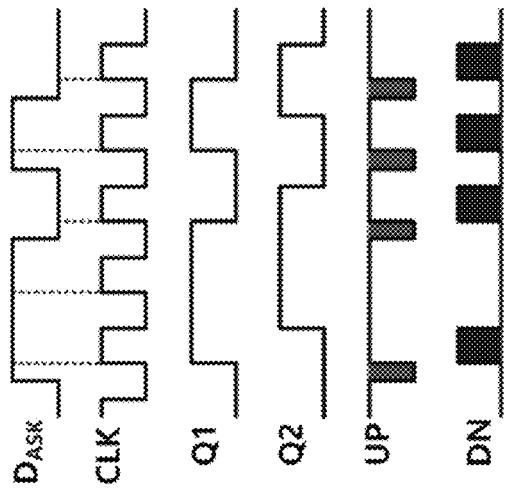

FIGS. 9A to 9C are views illustrating a process of synchronizing phases of the clock signal CLK and the demodulated data signal $D_{ASK}$ FIG. 9A is a view illustrating a case in which a phase of the clock signal CLK is ahead of a phase of the demodulated data signal $D_{ASK}$. Referring to FIG. 9A, when the phase of the clock signal CLK is ahead of the phase of the demodulated data signal $D_{ASK}$, a pulse width of the pump-down signal DN is wider than a pulse width of the pump-up signal UP. Accordingly, the charge pump 234 lowers a magnitude of the voltage of the control signal Vctrl formed by the loop filter 235. Accordingly, the oscillator 236 delays and outputs the phase of the clock signal CLK.

FIG. 9B is a view illustrating a case in which the phase of the clock signal CLK lags behind the phase of the demodulated data signal $D_{ASK}$ Referring to FIG. 9B, when the phase of the clock signal CLK lags behind the phase of the demodulated data signal $D_{ASK}$, the pulse width of the pump-up signal UP is wider than the pulse width of the pump-down signal DN. Accordingly, the charge pump 234 increases the magnitude of the voltage of the control signal Vctrl formed by the loop filter 235. Accordingly, the oscillator 236 forms and outputs the phase of the clock signal CLK so that the phase of the clock signal CLK is advanced.

The phase of the clock signal CLK adjusted like the above may coincide with the phase of the demodulated data signal $D_{ASK}$ as shown in FIG. 9C, and in this case, a rising edge of the clock signal CLK may be located at a center of the demodulated data signal $D_{ASK}$. From the above, the clock signal CLK and the data signal $D_{ASK}$ sampled by the clock signal CLK may be acquired.

As shown in FIGS. 8 and 9, a frequency and phase synchronization process between the demodulated data signal $D_{ASK}$ and the clock signal CLK may be performed. The clock data recovery unit 230 samples data with the recovered clock signal CLK and outputs data transmitted from the transmission side TX.

The above-described wireless power and data transmission and reception apparatus 10 may provide data and power to an electronic device implanted in the human body. For example, the transmission side TX may be located outside the skin of the human body, and the reception side RX may be implanted and located in the human body under the skin.

For example, the wireless power and data transmission and reception apparatus 10 may be a retina stimulus device providing an electrical stimulus to a visually impaired person. As another example, the wireless power and data transmission and reception apparatus 10 may be a cochlear stimulus device providing an electrical stimulus to a hearing impaired person.

Experimental Example

Figure 10:
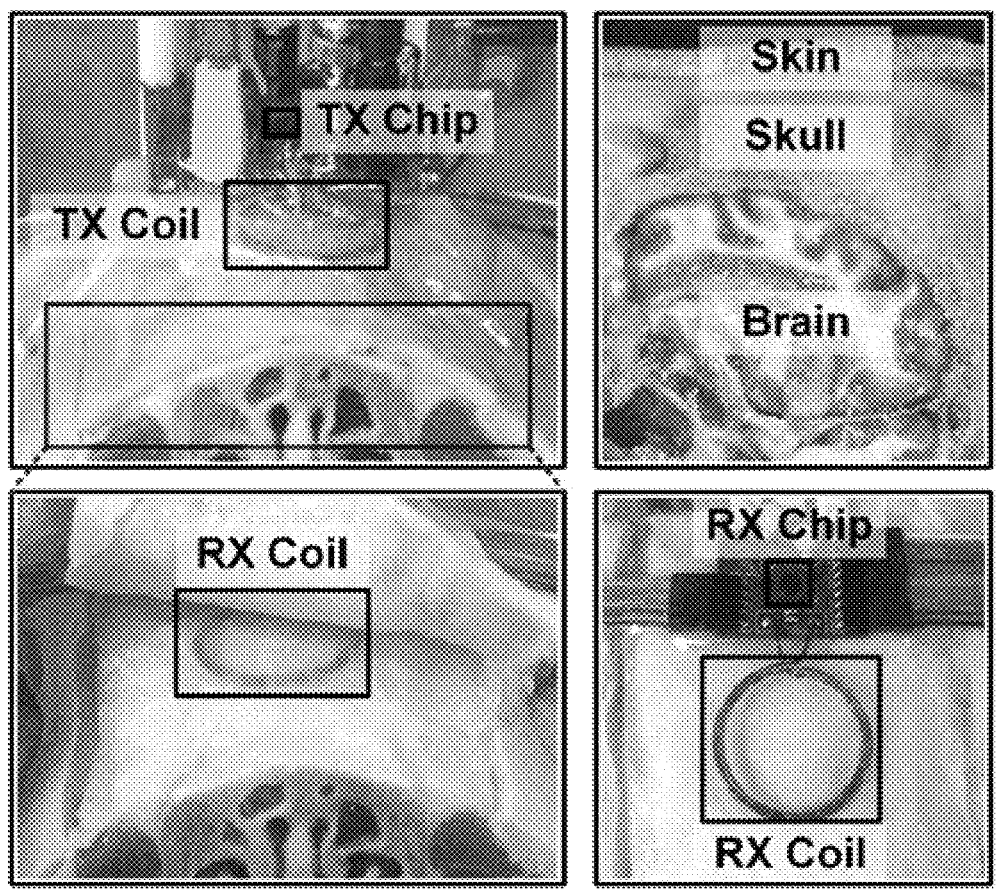
FIG. 10 is a view illustrating a state in which the wireless power and data transmission and reception apparatus according to the present embodiment is disposed on a pig's head.

FIG. 10 is a view illustrating a state in which the wireless power and data transmission and reception apparatus 10 according to the present embodiment is disposed on a pig's head. Referring to FIG. 10, the transmission coil TXcoil was disposed outside the skin, and the reception coil RXcoil was disposed 5 mm under the skin.

Figure 11B:
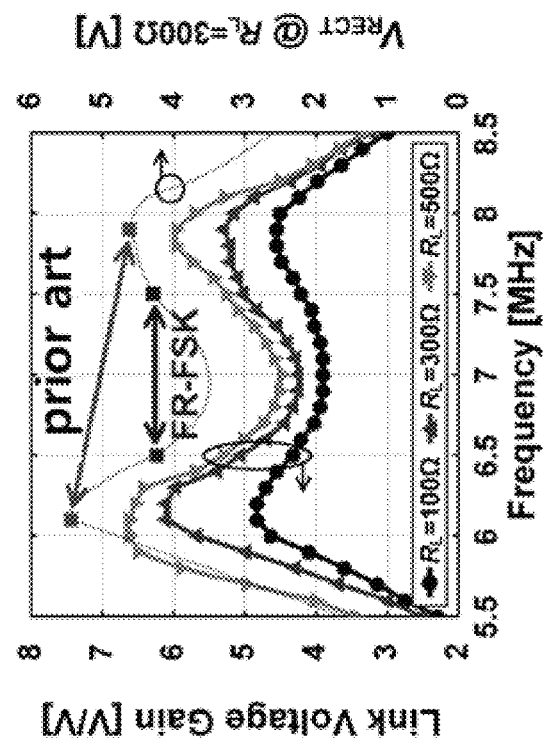
FIG. 11B is a view illustrating a link voltage gain according to the frequency change.
Figure 11A:
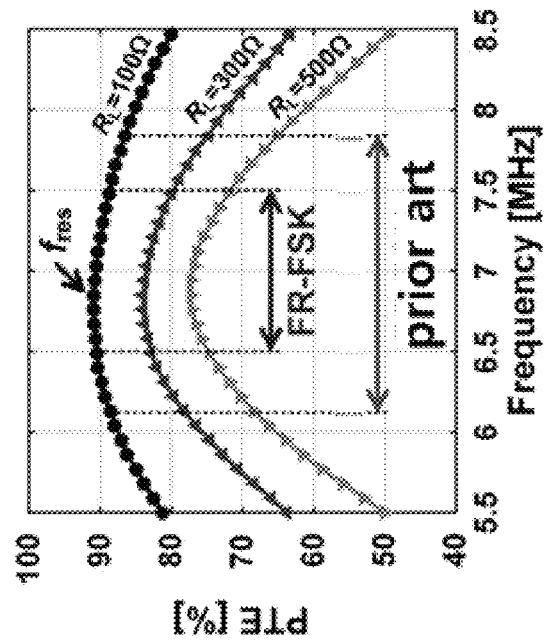
FIG. 11A is a view illustrating power transmission efficiency according to a frequency change in the above-described experimental environment.

FIG. 11A is a view illustrating power transmission efficiency (PTE) according to a frequency change in the above-described experimental environment, and FIG. 11B is a view illustrating a link voltage gain according to the frequency change. Referring to FIG. 11A, when a load resistance on the load side was 100 ohms, a maximum power transmission efficiency was 91.3%. Further, as shown in FIG. 11B, it can be seen that the link gain change according to the frequency change in the present embodiment shown as FR-FSK is lower than in the related art. Accordingly, it can be seen that a ripple formed at the reception side RX is lower than in the related art.

FIG. 12 is a view in which the present embodiment and the related art are compared. Referring to FIG. 12, the present embodiment has good form factor characteristics using two coils. It can be seen that a data transmission rate is 2.5 MHz and a bit error rate is $4*10^{-7}$, and thus this example has the best performance among the examples using two coils.

Specifically, a power delivered to the load (PDL) is 115 mW and a power transmission efficiency is 89.6%, and thus it can be seen that this technology has the best performance among technologies using two coils.

Although the embodiments shown in the drawings are described as a reference for helping to understand the present disclosure, they are embodiments for implementation, and merely exemplary, and various modifications and equivalents may be performed by those skills in the art. Accordingly, the true technical scope of the present disclosure should be defined by the appended claims.

What is claimed is:

1. A wireless power and data receiver comprising:
a reception coil configured to receive a power data signal from a transmission coil;
a power unit configured to form driving power from the power data signal; and
a data demodulation unit configured to demodulate a data signal from the power data signal,
wherein the reception coil operates adjacent to the transmission coil to the extent that a first resonant frequency and a second resonant frequency are formed between the reception coil and the transmission coil,
wherein the reception coil operates at a frequency greater than or equal to the first resonant frequency and smaller than or equal to the second resonant frequency in relation to the transmission coil, and
wherein the data demodulation unit includes a frequency-amplitude converter configured to convert the power data signal so that the power data signal has an amplitude corresponding to a frequency, a demodulator configured to demodulate a signal having a converted amplitude, and a clock data recovery unit configured to recover a clock and data from the demodulated signal.

2. The receiver of claim 1, wherein a process of demodulating the data signal from the power data signal and a process of forming the driving power from the power data signal are simultaneously performed.

3. The receiver of claim 1, wherein the power data signal is a signal in which the data signal is frequency-modulated to a carrier signal which transmits power.

4. The receiver of claim 1, wherein the power unit includes any one of a half-wave rectifier and a full-wave rectifier.

5. The receiver of claim 1, wherein the power unit includes a rectifier including a first branch including a diode-connected first P-channel metal-oxide-semiconductor (PMOS) transistor and a first N-channel metal-oxide-semiconductor (NMOS) transistor, and a second branch including a diode-connected second PMOS transistor and a second NMOS transistor, and wherein the first NMOS transistor and the second NMOS transistor are cross-coupled to each other.

6. The receiver of claim 1, wherein the frequency-amplitude converter includes an oscillator that is frequency-locked according to an injection signal, and an injection switch providing the injection signal to the oscillator.

7. The receiver of claim 6, wherein:
one electrode of the injection switch is connected to the oscillator;
the other electrode of the injection switch is connected to an injection signal source; and
a control electrode of the injection switch is connected to the reception coil.

8. The receiver of claim 7, wherein:
the injection signal source is a current mirror; and
the injection signal is a current signal.

9. The receiver of claim 1, wherein the demodulator includes an envelope signal forming unit configured to form an envelope signal corresponding to an envelope of an oscillator output signal, a low-pass filter configured to output a low-frequency component of the envelope signal, and a comparator configured to compare the envelope signal and the low-frequency component to output the data signal.

10. The receiver of claim 1, wherein the clock data recovery unit operates without a reference signal in a single loop.

11. The receiver of claim 1, wherein the clock data recovery unit includes a frequency and phase difference detection unit, a charge pump configured to operate by an output signal of the frequency and phase difference detection unit, a loop filter controlled by the charge pump to form a control signal, and a voltage-controlled oscillator of which an output signal is controlled by the control signal.

12. The receiver of claim 11, wherein:
the frequency and phase difference detection unit includes a first flip-flop to which an output of the demodulator is input, a second flip-flop connected to the first flip-flop in cascade, a first logic configured to perform a logical operation on the output of the demodulator and an output of the first flip-flop, and a second logic configured to perform a logical operation on the output of the first flip-flop and an output of the second flip-flop; and
the second flip-flop operates with a clock signal inverted from a clock signal provided to the first flip-flop.

13. The receiver of claim 1, wherein the power unit includes one or more of a DC-DC converter and a battery.

14. A wireless power and data transmission and reception apparatus comprising:
a transmission side which transmits a power data signal formed by frequency-modulating a data signal to a carrier signal which transmits power using a transmission coil; and
a reception side, which demodulates a power signal and the data signal from the power data signal and includes a reception coil,
wherein the reception coil operates adjacent to the transmission coil to the extent that a first resonant frequency and a second resonant frequency are formed,
wherein the reception coil operates at a frequency greater than or equal to the first resonant frequency and smaller than or equal to the second resonant frequency, and
wherein the data demodulation unit includes a frequency-amplitude converter configured to convert the power data signal so that the power data signal has an amplitude corresponding to a frequency, a demodulator configured to demodulate a signal having a converted amplitude, and a clock data recovery unit configured to recover a clock and data from the demodulated signal.

15. The apparatus of claim 14, wherein the reception side simultaneously performs a process of demodulating the power signal and a process of demodulating the data signal from the power data signal.

16. The apparatus of claim 14, wherein the reception side includes a power unit configured to form a direct current voltage from the power data signal, and a data demodulation unit configured to demodulate the data signal from the power data signal.

17. The apparatus of claim 14, wherein the frequency-amplitude converter includes an oscillator that is frequency-locked according to an injection signal, and an injection switch providing the injection signal to the oscillator.

18. The apparatus of claim 17, wherein:
one electrode of the injection switch is connected to the oscillator;
the other electrode of the injection switch is connected to a current mirror which is an injection signal source to receive a current signal which is an injection signal; and
a control electrode of the injection switch is connected to the reception coil.

19. The apparatus of claim 14, wherein the demodulator includes an envelope signal forming unit configured to form an envelope signal of an oscillator output signal, a low-pass filter configured to output a low-frequency component of the envelope signal, and a comparator configured to compare the envelope signal and the low-frequency component to output the data signal.

20. The apparatus of claim 14, wherein the clock data recovery unit operates without a reference signal in a single loop.

21. The apparatus of claim 14, wherein the clock data recovery unit includes a frequency and phase difference detection unit, a charge pump configured to operate by an output signal of the frequency and phase difference detection unit, a loop filter controlled by the charge pump to form a control signal, and a voltage control oscillator of which an output signal is controlled by the control signal.

22. The apparatus of claim 14, wherein the reception side is configured to be implanted in a body to operate.

* * * * *